United States Patent
Farrell et al.

(10) Patent No.: US 11,312,298 B2
(45) Date of Patent: Apr. 26, 2022

(54) MODULATING ATTENTION OF RESPONSIBLE PARTIES TO PREDICTED DANGERS OF SELF-DRIVING CARS

(71) Applicant: International Business Machines Corporation, Armonk, NY (US)

(72) Inventors: Robert G. Farrell, Cornwall, NY (US); James R. Kozloski, New Fairfield, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/777,342

(22) Filed: Jan. 30, 2020

(65) Prior Publication Data
US 2021/0237645 A1    Aug. 5, 2021

(51) Int. Cl.
| | | |
|---|---|---|
| *B60Q 9/00* | (2006.01) | |
| *G06N 20/00* | (2019.01) | |
| *B60H 3/00* | (2006.01) | |
| *G05D 1/00* | (2006.01) | |

(52) U.S. Cl.
CPC .............. *B60Q 9/00* (2013.01); *B60H 3/0035* (2013.01); *G05D 1/0088* (2013.01); *G06N 20/00* (2019.01); *G05D 2201/0213* (2013.01)

(58) Field of Classification Search
None
See application file for complete search history.

(56) References Cited

U.S. PATENT DOCUMENTS

| | | | |
|---|---|---|---|
| 6,618,716 B1* | 9/2003 | Horvitz | G06F 9/453 706/55 |
| 9,082,407 B1* | 7/2015 | Faaborg | G10L 15/22 |
| 9,622,180 B1* | 4/2017 | Yeung | H04W 68/005 |
| 10,026,309 B1* | 7/2018 | Nepomuceno | G08G 1/166 |
| 10,089,543 B2 | 10/2018 | Fung | |
| 10,147,320 B1* | 12/2018 | Ellis | G08G 1/163 |
| 10,173,586 B1* | 1/2019 | Kashchenko | G06K 9/00845 |

(Continued)

FOREIGN PATENT DOCUMENTS

CN    1085834030 A    9/2018

OTHER PUBLICATIONS

Mel, et al. "The NIST Definition of Cloud Computing". Recommendations of the National Institute of Standards and Technology. Nov. 16, 2015.

(Continued)

*Primary Examiner* — Curtis J King
(74) *Attorney, Agent, or Firm* — Peter Edwards, Esq.; McGinn I.P. Law Group, PLLC (57) ABSTRACT

An autonomous vehicle utilizing machine learning method, system, and computer program product include training, by a computing device, a driver attention model utilizing historical ambient sensor data and historical physiological sensor data associated with an autonomous vehicle, receiving ambient sensor data associated with a currently driving autonomous vehicle, receiving physiological sensor data associated with a driver of the currently driving autonomous vehicle, and using, by a computing device, the trained driver attention model in conjunction with the ambient sensor data and the physiological sensor data to generate an alert for a driver of the currently driving autonomous vehicle.

20 Claims, 5 Drawing Sheets

(56) References Cited

U.S. PATENT DOCUMENTS

| | | | |
|---|---|---|---|
| 10,209,708 B2 | 2/2019 | Hoye | |
| 10,268,191 B1* | 4/2019 | Lockwood | G05D 1/0027 |
| 10,331,128 B1* | 6/2019 | Hansel | G05D 1/0061 |
| 10,564,638 B1* | 2/2020 | Lockwood | G05D 1/0044 |
| 10,633,003 B1* | 4/2020 | Abundis Vargas | G06K 9/00664 |
| 10,783,725 B1* | 9/2020 | Gaudin | G06Q 40/08 |
| 10,825,098 B1* | 11/2020 | Bueche, Jr. | G06Q 40/08 |
| 2002/0095362 A1* | 7/2002 | Masand | G06Q 40/00 705/35 |
| 2002/0120374 A1* | 8/2002 | Douros | G07C 5/085 701/34.4 |
| 2005/0027182 A1* | 2/2005 | Siddiqui | G16H 40/67 600/365 |
| 2005/0103767 A1* | 5/2005 | Kainec | B23K 11/252 219/130.5 |
| 2005/0273830 A1* | 12/2005 | Silver | H04N 21/435 725/105 |
| 2009/0051521 A1* | 2/2009 | Crowe | B60Q 9/00 340/461 |
| 2009/0273457 A1* | 11/2009 | Bolduan | B60Q 3/80 340/438 |
| 2010/0036754 A1* | 2/2010 | Khan | G06Q 10/087 705/28 |
| 2011/0040482 A1* | 2/2011 | Brimble | G01C 3/08 701/301 |
| 2013/0209968 A1* | 8/2013 | Miller | G09B 9/052 434/65 |
| 2014/0014424 A1* | 1/2014 | Boncodin | B60L 8/00 180/65.31 |
| 2014/0156133 A1* | 6/2014 | Cullinane | B60K 35/00 701/23 |
| 2014/0172221 A1* | 6/2014 | Solyom | G08G 1/167 701/23 |
| 2015/0061856 A1* | 3/2015 | Raman | G08B 21/24 340/457 |
| 2015/0137482 A1* | 5/2015 | Woolf | B60D 1/06 280/448 |
| 2015/0258996 A1* | 9/2015 | Victor | G08G 1/0962 340/576 |
| 2015/0262484 A1* | 9/2015 | Victor | G09B 19/167 701/1 |
| 2015/0378558 A1* | 12/2015 | Smith | G06F 3/0485 715/777 |
| 2016/0071418 A1* | 3/2016 | Oshida | B60W 30/165 701/23 |
| 2016/0146618 A1* | 5/2016 | Caveney | B60W 50/14 701/25 |
| 2016/0288831 A1* | 10/2016 | Lee | B60W 30/10 |
| 2017/0108864 A1* | 4/2017 | Wiklinska | G06K 9/00832 |
| 2017/0135621 A1* | 5/2017 | Lee | A61B 3/10 |
| 2017/0174229 A1* | 6/2017 | Mueller | G05D 1/0061 |
| 2017/0234689 A1* | 8/2017 | Gibson | G05D 1/0061 701/25 |
| 2017/0235628 A1* | 8/2017 | Nguyen | G06F 11/0781 714/37 |
| 2017/0236210 A1* | 8/2017 | Kumar | G05D 1/0061 705/4 |
| 2017/0256167 A1* | 9/2017 | Kim | G08G 1/166 |
| 2017/0305425 A1* | 10/2017 | Xing | B60W 30/182 |
| 2017/0329329 A1* | 11/2017 | Kamhi | G06K 9/00604 |
| 2017/0349186 A1* | 12/2017 | Miller | B60W 40/08 |
| 2018/0025240 A1* | 1/2018 | Klement | H04N 13/239 348/47 |
| 2018/0081358 A1* | 3/2018 | Laur | G05D 1/0088 |
| 2018/0095477 A1* | 4/2018 | Borngraber | B60W 50/00 |
| 2018/0105184 A1* | 4/2018 | Urano | G05D 1/0061 |
| 2018/0126985 A1* | 5/2018 | Lee | B61L 15/0027 |
| 2018/0154903 A1 | 6/2018 | Song | |
| 2018/0170181 A1* | 6/2018 | Tan | B60K 35/00 |
| 2018/0211218 A1* | 7/2018 | Berdinis | G06Q 10/08345 |
| 2018/0217598 A1* | 8/2018 | Kuhara | G06Q 10/08 |
| 2018/0233040 A1* | 8/2018 | Zydek | B60W 60/0027 |
| 2018/0237012 A1* | 8/2018 | Jammoussi | G05D 1/0088 |
| 2018/0319408 A1* | 11/2018 | Hoetzer | B60W 50/14 |
| 2018/0329415 A1* | 11/2018 | Aoi | B60W 60/0051 |
| 2018/0362070 A1* | 12/2018 | Letwin | B62D 1/28 |
| 2019/0011910 A1* | 1/2019 | Lockwood | G08G 1/165 |
| 2019/0011912 A1* | 1/2019 | Lockwood | G05D 1/0231 |
| 2019/0011931 A1* | 1/2019 | Selvam | G08G 1/123 |
| 2019/0019068 A1 | 1/2019 | Zhu | |
| 2019/0025825 A1* | 1/2019 | Takahama | B60W 60/0053 |
| 2019/0041850 A1* | 2/2019 | Chase | G08G 1/09675 |
| 2019/0047417 A1* | 2/2019 | Aoi | B60W 40/04 |
| 2019/0056732 A1 | 2/2019 | Aoi | |
| 2019/0077308 A1* | 3/2019 | Kashchenko | G06N 3/08 |
| 2019/0146508 A1* | 5/2019 | Dean | G05D 1/0274 701/26 |
| 2019/0186947 A1* | 6/2019 | Rockmore | G01C 21/3697 |
| 2019/0204827 A1* | 7/2019 | Bhalla | G05D 1/0061 |
| 2019/0225236 A1* | 7/2019 | Hashimoto | B60W 30/18163 |
| 2019/0228663 A1* | 7/2019 | Meyers | G08G 1/202 |
| 2019/0243364 A1* | 8/2019 | Cohen | G06K 9/00671 |
| 2019/0278268 A1* | 9/2019 | Rezaeian | B60W 60/0053 |
| 2019/0278297 A1* | 9/2019 | Averhart | G05D 1/0278 |
| 2019/0311559 A1* | 10/2019 | Bigio | G01C 21/3697 |
| 2019/0322291 A1* | 10/2019 | Tsuda | G05D 1/0088 |
| 2019/0327619 A1* | 10/2019 | Altintas | H04W 74/006 |
| 2019/0351916 A1* | 11/2019 | Mangai | B60K 35/00 |
| 2020/0001779 A1* | 1/2020 | Alexander | G05D 1/0088 |
| 2020/0097012 A1* | 3/2020 | Hong | A47L 11/4011 |
| 2020/0108840 A1* | 4/2020 | Andres | B60W 40/09 |
| 2020/0285231 A1* | 9/2020 | Herman | B60Q 9/00 |
| 2020/0319635 A1* | 10/2020 | Andres | G05D 1/0088 |
| 2020/0401126 A1* | 12/2020 | Cermak | G05D 1/0022 |
| 2020/0410018 A1* | 12/2020 | Gao | G06F 16/9535 |
| 2021/0101622 A1* | 4/2021 | Yu | G06K 9/00 |

OTHER PUBLICATIONS

Baheti, B., Gajre, S., Talbar, S. (2018). Detection of Distracted Driver Using Convolutional Neural Network, The IEEE Conference on Computer Vision and Pattern Recognition (CVPR) Workshops, 2018, pp. 1032-1038. See abstract. Retrieved from http://openaccess.thecvf.com/content_cvpr_2018_workshops/w14/html/Baheti_Detectio_of_Distracted_CVPR_2018_paper.html.

* cited by examiner

MODULATING ATTENTION OF RESPONSIBLE PARTIES TO PREDICTED DANGERS OF SELF-DRIVING CARS

BACKGROUND

The present invention relates generally to an autonomous vehicle utilizing machine learning method, and more particularly, but not by way of limitation, to a system, method, and computer program product for modulating the attention of responsible parties to the predicted dangers of self-driving vehicles.

One of the advantages of self-driving vehicles is that they may make drivers blissfully unaware of the details of road. Freed of the attention required by driving and its associated stress, drivers are free to become passengers who talk, relax, and use in-car devices.

However, this situation is not practical in many situations. For example, for taxis (or private contract drivers such as Uber®, Lyft®, etc.), taxi technology companies have deployed self-driving cars, but may require a responsible "safety" party who is charged with taking over operation in case of danger. These safety drivers need to be keenly aware of the situation outside the vehicle. For buses, given a rise in the number of self-driving vehicles in cities, professional drivers such as bus drivers are also responsible parties. The safety of passengers is at risk if the driver is completely unaware of the operational situation faced by the bus. For trucks, the rear convoy drivers for long haul self-driving trucks are responsible for the entire convoy. A single driver must simultaneously maintain and guard the convoy of trucks. For rental cars, people renting cars bear responsibility for the safe operation of the vehicle, despite it being primarily operated in an autonomous mode. Therefore, car renters need to be able to monitor operation of the car and may take on the role of safety drivers.

In all of these cases, a person has some responsibility for the vehicle's passengers, potential passengers, cargo, or the vehicle and its electronics (the safety driver), in the case of danger to themselves, passengers, or the vehicle, despite the vehicle being self-driving. However, in tests of self-driving vehicles some safety drivers fell asleep at the wheel without anything to do, while others were paying attention to cell phones or games or other distractions in the car instead of the road. Indeed, in many situations, object recognition may still need a driver's attention (i.e., may be best) as opposed to camera-based object recognition.

Therefore, a technique is needed to modulate the attention of responsible parties to predicted dangers of self-driving vehicles.

Some conventional techniques have considered a technique that only signals the safety driver to take over (based on cleared traffic and/or speed) and it does not modulate their attention to keep them awake/safety-minded/prepared. Other conventional techniques sense the level of attention of drivers in vehicles by sensing head position, facial expression, and blinking rate. Other technology detects eyelids drooping.

Thus, although there is technology for predicting dangers on the road, there are no conventional techniques for predicting the dangers of self-driving cars on the road. Moreover, although some technology exists for estimating the level of attention drivers give to the vehicle context (or level of distraction) based on visual, auditory, and cognitive factors, there are no systems that modulate alerting of the driver in real-time according to the predicted dangers on the road as well as no technology for generating alerts and other interactions with responsible parties of self-driving vehicles according to the predicted dangers of a self-driving vehicle on the road (as indicated partially by its low confidence in driving actions in such situations) and the predicted level of attention drivers will give to the road context.

SUMMARY

Thereby, the inventors have identified a need in the art for a technique to modulate the attention of responsible parties to the predicted dangers of self-driving vehicles.

In an exemplary embodiment, the present invention provides a computer-implemented autonomous vehicle utilizing machine learning method, the method including training, by a computing device, a driver attention model utilizing historical ambient sensor data and historical physiological sensor data associated with an autonomous vehicle, receiving ambient sensor data associated with a currently driving autonomous vehicle, receiving physiological sensor data associated with a driver of the currently driving autonomous vehicle, and using, by a computing device, the trained driver attention model in conjunction with the ambient sensor data and the physiological sensor data to generate an alert for a driver of the currently driving autonomous vehicle.

In another exemplary embodiment, the present invention provides a computer program product, the computer program product for discovering a utility of a data schema for a machine-learning model comprising a computer-readable storage medium having program instructions embodied therewith, the program instructions executable by a computer to cause the computer to perform: training, by a computing device, a driver attention model utilizing historical ambient sensor data and historical physiological sensor data associated with an autonomous vehicle, receiving ambient sensor data associated with a currently driving autonomous vehicle, receiving physiological sensor data associated with a driver of the currently driving autonomous vehicle, and using, by a computing device, the trained driver attention model in conjunction with the ambient sensor data and the physiological sensor data to generate an alert for a driver of the currently driving autonomous vehicle.

In another exemplary embodiment, the present invention provides an autonomous vehicle utilizing machine learning system for discovering a utility of a data schema for a machine-learning model, the system including a processor and a memory, the memory storing instructions to cause the processor to perform: training, by a computing device, a driver attention model utilizing historical ambient sensor data and historical physiological sensor data associated with an autonomous vehicle, receiving ambient sensor data associated with a currently driving autonomous vehicle, receiving physiological sensor data associated with a driver of the currently driving autonomous vehicle, and using, by a computing device, the trained driver attention model in conjunction with the ambient sensor data and the physiological sensor data to generate an alert for a driver of the currently driving autonomous vehicle.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
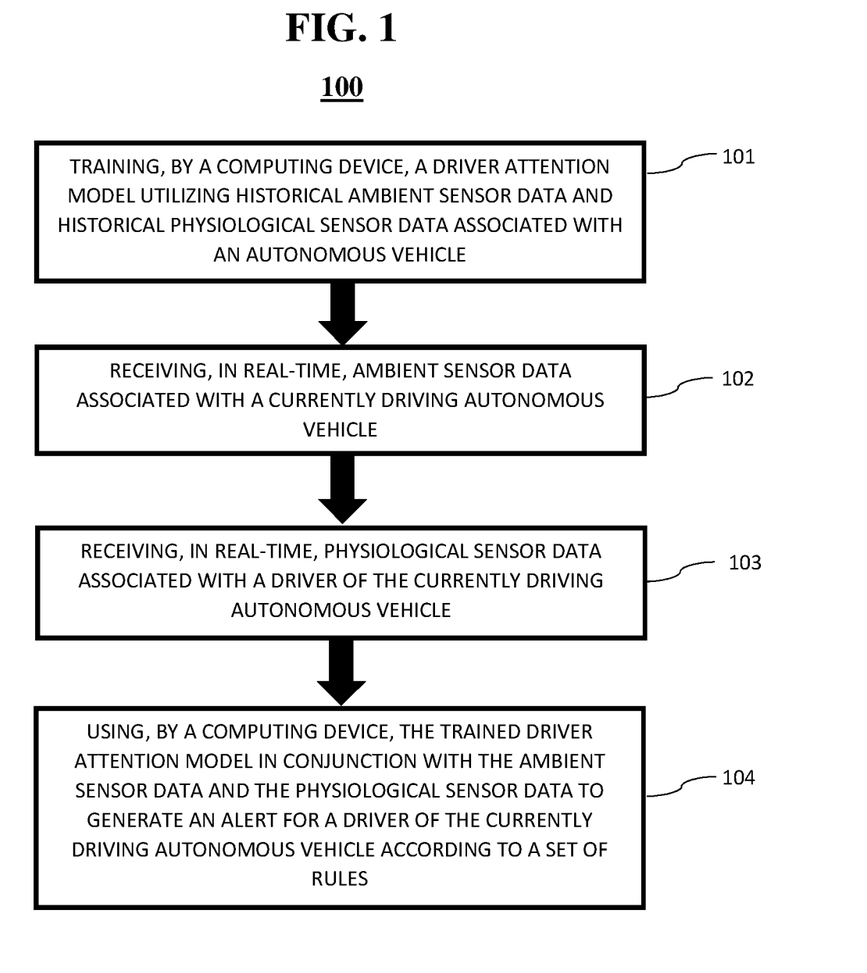
FIG. 1 exemplarily shows a high-level flow chart for an autonomous vehicle utilizing machine learning method 100 according to an embodiment of the present invention.

By way of introduction of the example depicted in FIG. 1, an embodiment of an autonomous vehicle utilizing machine learning method 100 according to the present invention can include various steps for engaging responsible parties (e.g., those who may be inattentive or distracted) by modulating alerts continuously based on differences between the driver's level of attention required for future road hazards and the driver's current level of attention as measured by, for example, sensors. Alerted responsible parties can then take action (e.g., warning other drivers, protecting passengers, or taking over the vehicle, etc.).

Figure 3:
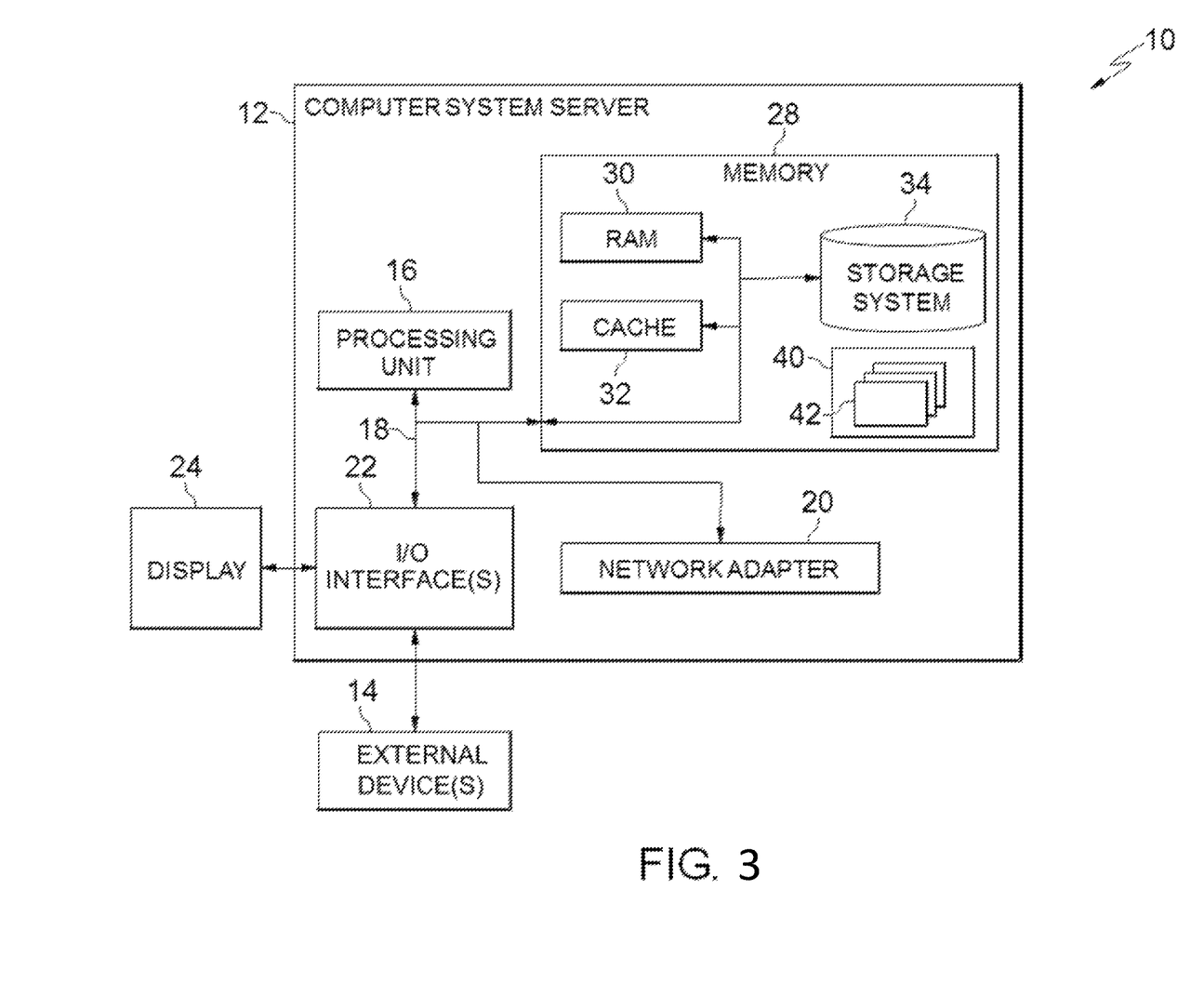
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 5), it is nonetheless understood that the present invention can be implemented outside of the cloud environment.

Figure 2:
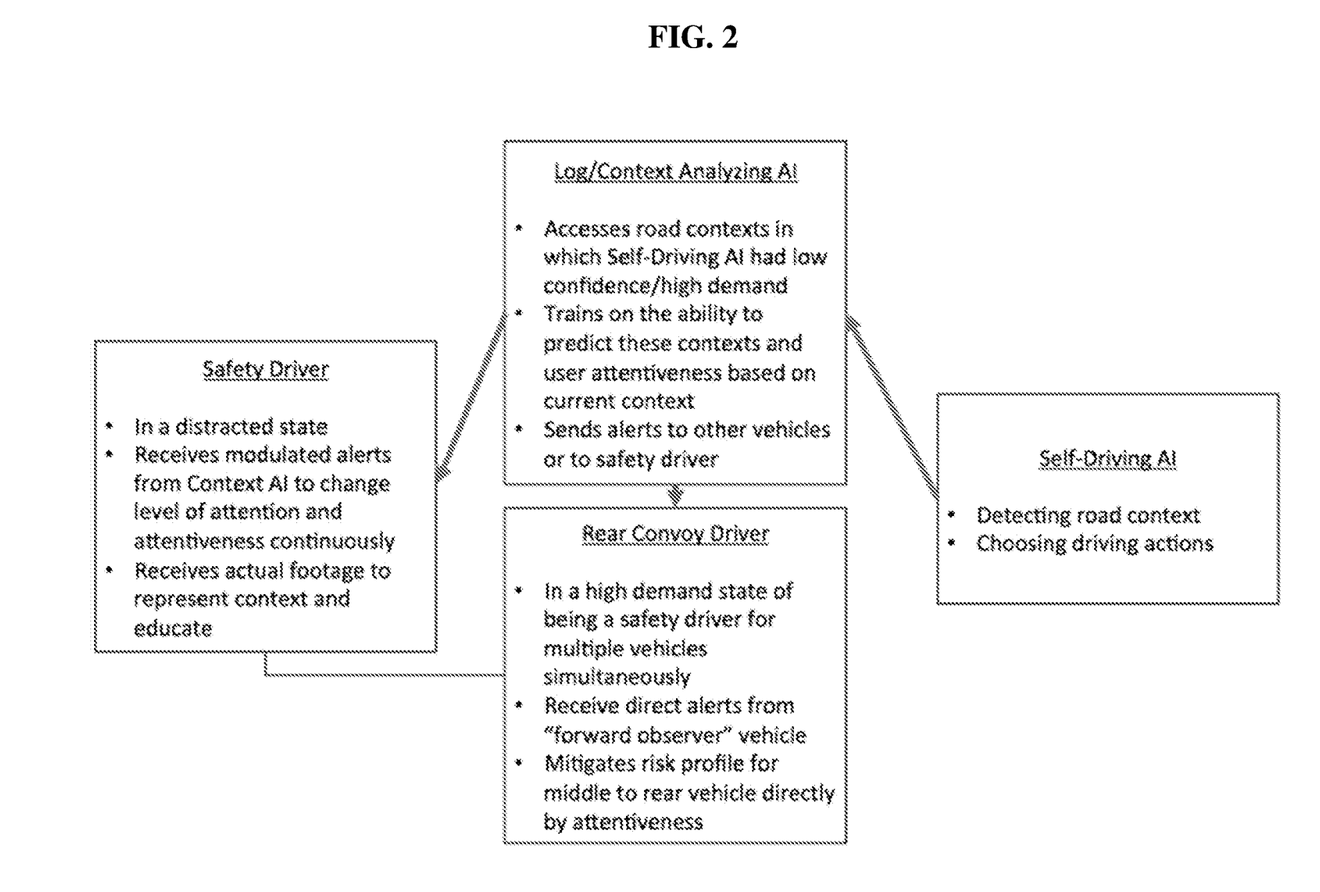
FIG. 2 exemplarily depicts a flow chart of factors for the method 100 according to an embodiment of the present invention.

With reference generally to FIGS. 1 and 2, in step 101, by a computing device, a driver attention model utilizing historical ambient sensor data and historical physiological sensor data associated with an autonomous vehicle is trained.

In step 102, in real-time, ambient sensor data associated with a currently driving autonomous vehicle is received.

In step 103, in real-time, physiological sensor data associated with a driver of the currently driving autonomous vehicle is received.

And, in step 104, by a computing device, the trained driver attention model is used in conjunction with the ambient sensor data and the physiological sensor data to generate an alert (e.g., dashboard, auditory, olfactory, etc.) for a driver of the currently driving autonomous vehicle according to a set of rules.

The trained machine learning driver attention model generates the alert when physiological sensor data indicates a predicted attention of the driver falls below a confidence threshold (i.e., one of the rules). Or, the trained machine learning driver attention model generates the alert when ambient sensor data indicates a dangerous condition beyond a danger threshold (i.e., another one of the rules). In an exemplary embodiment, a Kalman filter is tasked with learning to predict driver attention based on physiological sensor data and a responsiveness of the driver to stimuli. For example, if attention is quantified as a reaction time to a question, then that reaction time can be plotted as a time series, which is then predicted by the Kalman filter, which itself is updated based on actual measured reaction time to a subsequent question. The question in this case might be a simple request time acknowledgement, such as "John?" to which the driver responds "Yes?". A set of road sensors tasked with predicting future road objects, such as a PreNet (https://coxlab.github.io/prednet/) is then used to provide input on future dangerous road hazards or uncertainties about the identity of objects in or near the road in the path ahead. The Kalman filter plus PredNet then provide inputs Deep Reinforcement Learning (DRL) component which is trained to provide arousing stimuli to the driver in order to restore the predicted attention level to above the desired threshold. The DRL receives reward when the chosen arousing stimulus achieves the desired attention level, and (optionally) punishment when the chosen arousing stimulus does not achieve the desired attention level.

Indeed, there are a number of high demand situations faced by human drivers and Self-Driving AI (SDAI) vehicles where a person responsible for the vehicle will want to be aware of the road context, understand it, and perhaps disengage the SDAI vehicle, alert another vehicle (e.g., honk horn, relay a message to the rear of a convoy, etc.), or take action to protect passengers (e.g., quiet down kids). The balance between prompted driver attentiveness to these situations and enjoyment of the relief from attentiveness afforded by self-driving functions of the vehicle is important for acceptance of this technology.

That is, for the method 100, the level of attention required for future road hazards is learned by the method over road context data using an attentive safety driver. The method learns the road contexts where the attentive safety driver takes action and the SDAI confidence is low. Some contexts may include tree down, pothole, swerving car, etc. These can be weather-related, road condition or geometry-related, traffic-related, mechanical failure of SDAI vehicle or other vehicles. Many classes may correspond to categories of alerts.

If there is information or data that would improve a responsible party's understanding of the SDAIs reason for driving actions that can be communicated in an alert, then this information can also be communicated. For example, if the SDAI was slowing down due to lane changes ahead, that could be added to the alert (e.g., such as in FIG. 2).

Indeed, the invention employs a method following during training of:
(i) Trains a driver attention model over ambient and physiological monitors of a highly attentive driver; and (ii) Trains a self-driving context model over road context data collected from vehicle sensors and a confidence level label from SDAI driving action selection method.

The driver attention model is learned from road context data and the monitored level of attention. It can be used to predict the level of attention of driver for each category of road context data. For example, drivers may in general start paying attention more when an animal runs across the road. This model is built from typical driver data.

The SDAI context model can be used to predict the level of confidence of the SDAI in future situations for each category of road context data. For example, in situations where there is a police car ahead, its confidence in its actions in the future may be predicted to be low.

The method employs a technique following these steps during execution:
(i) Monitors the level of attention of the safety driver;
(ii) Detects road contexts for a future situation and classifies them;
(iii) Predicts level of driver attention for the future situation given the road context classification using the driver attention model;
(iv) Predicts level of attention required given the road context classification using the self-driving context model; and
(v) Modulates alerts to the responsible party and/or driver using sound and vehicle displays In addition, the method captures video and vehicle data that can be used to review the road context offline.

Alerts may be displayed when the difference threshold between the predicted level of attention required (e.g., from the self-driving context model) and the predicted level of drive attention for the future situation falls below a threshold of attention. The sliding difference threshold is a function of the self-driving context's model's predicted SDAI confidence level (i.e., an inverse relationship).

Thus, if the confidence of the SDAI is predicted to be low ahead (e.g., due to a parked car at the side of the road) and driver is predicted to have grossly insufficient attention for this situation (e.g., they are sleeping), then the method will continue alerts (e.g., loud audio "situation ahead" on dashboard: shows situation is at right side of car). If the SDAI is predicted to have very low confidence ahead (e.g., due to an accident on the side of the road), then the sliding difference threshold may be set even more stringently, and therefore a driver who is checking their voicemail may be similarly alerted.

Referring back to method 100 and steps 101-104, the method logs at each time T where:
A: a road context classification based on road context data (e.g., distance to nearest car, cars on side of road, etc.) and the level of confidence in the classification. This includes at least one audio-visual feature from the environment from a sensor onboard at least one vehicle;
B. Self-Driving AI's driving action and (e.g., low) level of confidence in the action; and
C. A (high-performing) human operator's level of attention as measured by attention sensors.

Then, the method trains the model by:
1. Trains a driver attention model to predict driver level of attention;
2. Trains a threshold determining model to provide a minimum attention needed given the road context data, actions of the SDAI method, and expected confidence of the SDAI in the immediate future (regression, neural network, or other linear or non-linear model).

Using the trained model the method 100 runs the driver attention model on the current road contexts and level of confidence in self-driving actions taken by the SDAI and communicates the road context classification, (low) expected level of confidence, optionally predicted level of attention needed and/or actual level of attention sensed by attention sensors to responsible parties and other vehicles if the predicted level of attention required minus the actual level of attention sensed exceeds a threshold M. The method takes human engagement actions to modulate (stimulate and maintain) attention of the responsible party according to the predicted level of attention needed and alerts users to:
(i) the road context classification (e.g., a short auditory prompt, "police at side of road") with an option to receive more detail given a voice command);
(ii) the detected road context features if available (e.g. police car highlighted on heads-up display);
(iii) the road context data itself (e.g., live footage from the front vehicle); and
(iv) the (low) level of confidence in the SDAI driving action (e.g., subtle colour on dash turns darker given lower confidence, and blinks if very low confidence)

Following the incidence, reports on the road conditions, confidence in SDAI driving actions, predicated level of attention needed, and actual level of attention measure may be sent to a responsible party (e.g., the safety driver, taxi/bus/convoy driver) so that the party is more aware of the situations faced by the vehicle or an insurance company.

The responsible party may be the owner of the vehicle, the person sitting in the driver's seat of the vehicle (but not driving), an official safety driver, a person monitoring the vehicle remotely, an insurance company reviewing the operation of the car, etc. It is noted that the amount of responsibility also may determine the amount of modulation taken.

Situations detected might include other cars coming too close, not stopping at a traffic indicator, not in correct lane, pedestrians/animals/cyclists/object crossing path, emergency vehicle detected, weather, self (e.g., off road, stopped too long, insufficient power, etc.), the road such as sign in wrong place, lane marked wrong, sudden turn or dip.

Alerts may take the form of an auditory alert that are designed for type and level of urgency, a visual alert that includes flashing, highlighting on head up display, a tactile alert such as buzz on seat, watch, mobile phone, floor of car, air blown, an olfactory stimulus such as a puff of smell to wake driver, etc.

Levels may be modulated by the level of difference with the attention model. The road context classification can be used to determine the type of alert.

To maintain confidence in the SDAI while at the same time communicating the SDAI is taking actions that it has less confidence in, the messaging for this level may be fleeting (e.g., fading) and subtle (e.g., light, colour, etc.), if used.

If the attention sensing is not available, then the level of attention can default to a fixed value and the level of required attention can be used alone.

Reporting may take the form of:
messages—a listing of operational situations with their time, description, and link to video to review;
alerts—sounds or visual indicators or buzzed seat or steering wheel to indicate that there are operational situations to review;
saving for later—ability to store the operational situations to act on later;

sending reports—the situational messages can be communicated to other parties;

playback/fly-throughs—ability to review the audio/video from one or more cameras that detected the situation; and tests—ability to select a response for a detected situation. This involves characterizing the action that the self-driving vehicle took with a label and providing that label to the user and the ability to fill in templates with alternate responses. For example, if shown a child in the street, the options might be: A. wait 10 seconds and drive B. drive around the person and C. stop until the person moves (the option taken).

Insurance companies may want to offer discounts for self-driving vehicle owners who use technology. Drivers using the technology could be better at reporting accidents, making sure laws are obeyed, and maintaining the operation and safety of the vehicle.

Using the invention, the autonomous vehicle could quickly recap the situation for the safety driver. "There were three dangerous situations I detected back there. The vehicle behind you was too close. The vehicle to your left was drifting out of its lane. An animal at the side of the road was headed into the road in front of you".

In some embodiments of the invention, the vehicle may check or test the safety driver's gaze (gaze detection), operation of simulated brakes or steering, hearing (e.g., saying what sound they heard), position in the seat (upright?), or cognition (e.g., a test on the objects "Q: what kind of animal was it in the path? A: A dog S: "I think it was a cat" or situations (S: "what was the Chevy Tahoe doing?" A: going too slow? S: "No, it was going the speed limit. It was driving too close to the car in front of it").

Given prior situations, perhaps with other drivers on the same stretch of roadway or the driver previously on the trip or in general, one could project the possible future situations and generate a suitable explanation of the dangerous ones or a test of the dangers. And, situation reports may want to be saved for later or sent to another party.

Thus, the invention here includes a method for engaging responsible parties (e.g., who may be inattentive or distracted) by modulating alerts continuously based on differences between the driver level of attention required for future road hazards and the driver's current level of attention as measured by sensors. Alerted responsible parties can then act (e.g., warning other drivers, protecting passengers, or taking over the vehicle).

Moreover, the system can learn ("be trained") based on driver's actions/attention. Additionally, the system may change a vehicles actions (e.g., speed) or generate alerts to arouse/gain a drivers attention based on an uncertainty in object recognition (or prediction of problem/uncertainty).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented andlor performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
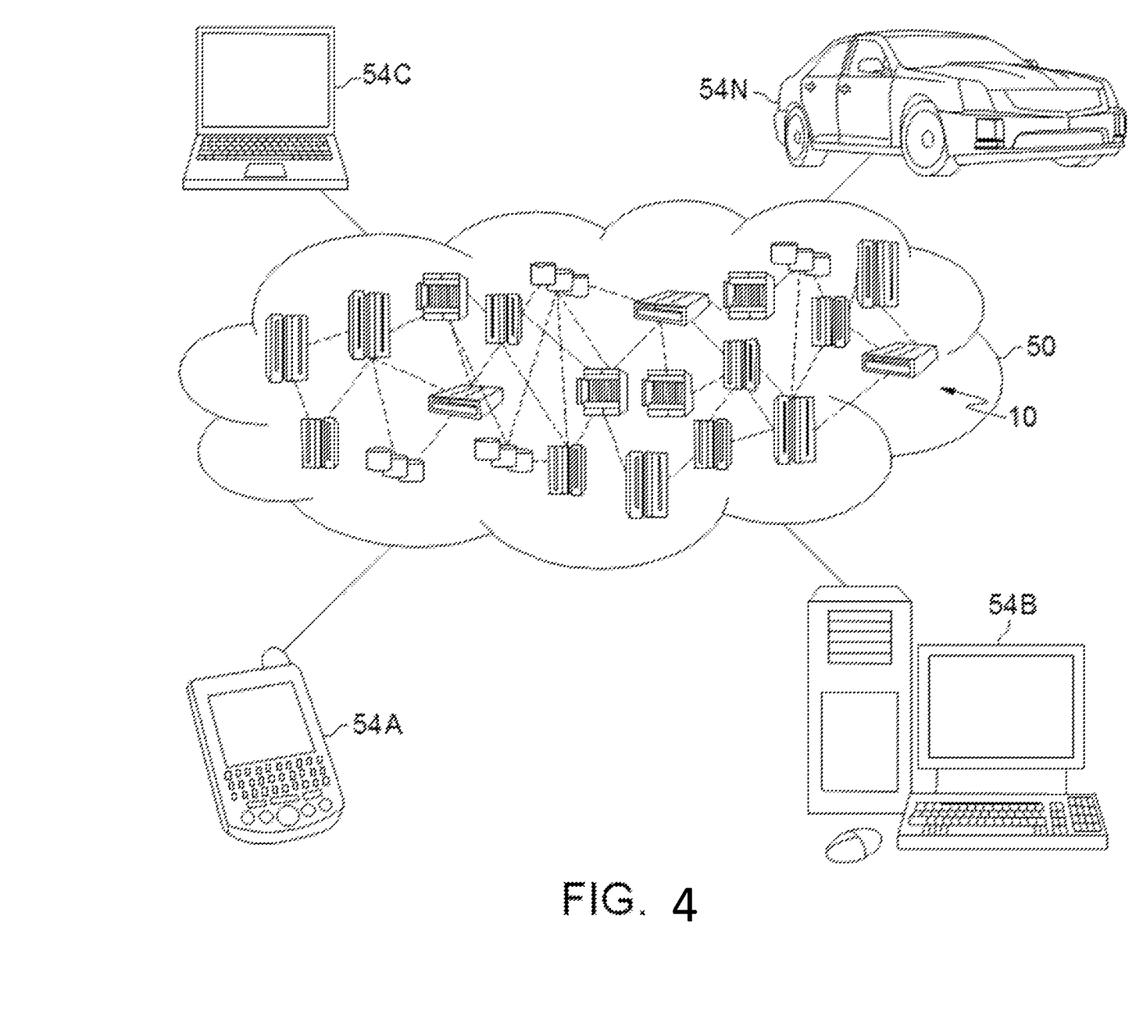
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
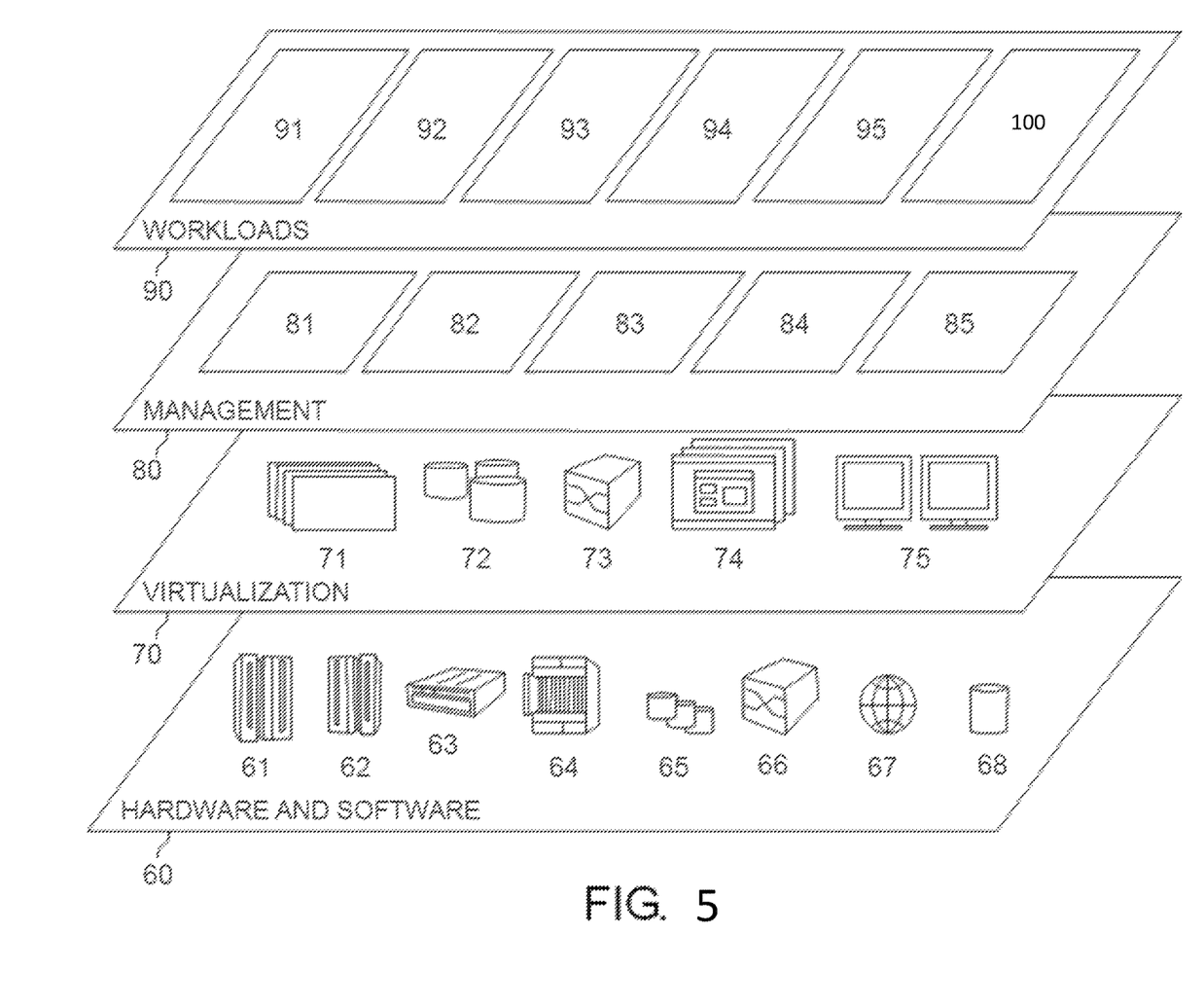
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced. Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and autonomous vehicle utilizing machine learning method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented autonomous vehicle utilizing machine learning method, the method comprising:
    training, by a computing device, a driver attention model utilizing historical ambient sensor data and historical physiological sensor data associated with an autonomous vehicle;
    receiving ambient sensor data associated with a currently driving autonomous vehicle;
    receiving physiological sensor data associated with a driver of the currently driving autonomous vehicle; and
    using, by the computing device, the trained driver attention model in conjunction with the ambient sensor data and the physiological sensor data to generate an alert with various sensory stimuli for a driver of the currently driving autonomous vehicle, a type of the sensory stimulus of the various sensory stimuli is selected according to a responsiveness of the driver to the sensory stimulus according to a historical responsiveness,
    wherein the trained driver attention model generates the alert based on physiological sensor data indicating a predicted attention of the driver falls below a confidence threshold,
    wherein the alert is generated according to a confidence of a self-driving AI (SDAI) being able to navigate while the SDAI is activated, and
    wherein the SDAI is disengaged when the alert is generated and a reason for the alert causing the SDAI to disengage is output.

2. The method of claim 1, wherein the alert for the driver of the currently driving autonomous vehicle is generated according to a set of rules,
    wherein the reason is based on data that improves an understanding by the driver of the reason that the SDAI is disengaged, and
    wherein the autonomous vehicle outputs a summary of each element of the reason for the alert.

3. The method of claim 1, wherein the trained driver attention model generates the alert when ambient sensor data indicates a dangerous condition beyond a danger threshold.

4. The method of claim 1, wherein the type of the sensory stimulus of the alert comprises one of:
    an auditory alert;
    a visual alert;
    a tactile alert; and
    an olfactory alert.

5. The method of claim 1, wherein the alert comprises an olfactory alert including a smell emitted from the vehicle to alert the driver.

6. The method of claim 1, wherein the confidence threshold is trained using a threshold determining model to provide a minimum attention needed given road context data, actions of the SDAI, and an expected confidence of the SDAI in an immediate future.

7. The method of claim 1, wherein, by the computing device, monitoring a level of attention of the driver based on the physiological sensor data;
detecting road contexts for a future situation and classifies a road context;
predicting predicted attention of the driver for a future situation given the road context classification using the trained driver attention model;
predicting level of attention required given the road context classification using the self-driving context model; and
modulating a frequency and intensity of the alert with the various sensory stimuli to the driver.

8. The method of claim 1, wherein a Kalman filter is tasked with learning to predict driver attention based on the physiological sensor data and a responsiveness of the driver to the various sensory stimuli, and
wherein an output from the Kalman filter provides an input to a Deep Reinforcement Learning (DRL) component which is trained to provide the various sensory stimuli to the driver in order to restore the predicted attention of the driver to above the confidence threshold.

9. The method of claim 1, wherein, by the computing device, characterizing an action that the SDAI took with a label based on the reason and providing the label to a tester such that alternate responses are substituted for the action to modify the SDAI.

10. The method of claim 1, wherein, by the computing device, proactively engages the driver by continuously modulating different alerts based on a different between a required attention level of the driver and a current attention level of the driver.

11. A computer program product, the computer program product for discovering a utility of a data schema for a machine-learning model comprising a computer-readable storage medium having program instructions embodied therewith, the program instructions executable by a computer to cause the computer to perform:
training, by a computing device, a driver attention model utilizing historical ambient sensor data and historical physiological sensor data associated with an autonomous vehicle;
receiving ambient sensor data associated with a currently driving autonomous vehicle;
receiving physiological sensor data associated with a driver of the currently driving autonomous vehicle; and
using, by the computing device, the trained driver attention model in conjunction with the ambient sensor data and the physiological sensor data to generate an alert with various sensory stimuli for a driver of the currently driving autonomous vehicle, a type of the sensory stimulus of the various sensory stimuli is selected according to a responsiveness of the driver to the sensory stimulus according to a historical responsiveness,
wherein the trained driver attention model generates the alert based on physiological sensor data indicating a predicted attention of the driver falls below a confidence threshold,
wherein the alert is generated according to a confidence of a self-driving AI (SDAI) being able to navigate while the SDAI is activated, and
wherein the SDAI is disengaged when the alert is generated and a reason for the alert causing the SDAI to disengage is output.

12. The computer program product of claim 11, wherein the alert for the driver of the currently driving autonomous vehicle is generated according to a set of rules.

13. The computer program product of claim 11, wherein the trained driver attention model generates the alert when ambient sensor data indicates a dangerous condition beyond a danger threshold.

14. The computer program product of claim 11, wherein the type of the sensory stimulus of the alert comprises one of:
an auditory alert;
a visual alert;
a tactile alert; and
an olfactory alert.

15. The computer program product of claim 11, wherein the alert comprises an olfactory alert including a smell emitted from the vehicle to alert the driver.

16. An autonomous vehicle utilizing machine learning system for discovering a utility of a data schema for a machine-learning model, the system comprising:
a processor; and
a memory, the memory storing instructions to cause the processor to perform:
training, by a computing device, a driver attention model utilizing historical ambient sensor data and historical physiological sensor data associated with an autonomous vehicle;
receiving ambient sensor data associated with a currently driving autonomous vehicle;
receiving physiological sensor data associated with a driver of the currently driving autonomous vehicle; and
using, by the computing device, the trained driver attention model in conjunction with the ambient sensor data and the physiological sensor data to generate an alert with various sensory stimuli for a driver of the currently driving autonomous vehicle, a type of the sensory stimulus of the various sensory stimuli is selected according to a responsiveness of the driver to the sensory stimulus according to a historical responsiveness,
wherein the trained driver attention model generates the alert based on physiological sensor data indicating a predicted attention of the driver falls below a confidence threshold,
wherein the alert is generated according to a confidence of a self-driving AI (SDAI) being able to navigate while the SDAI is activated, and
wherein the SDAI is disengaged when the alert is generated and a reason for the alert causing the SDAI to disengage is output.

17. The system of claim 16, wherein the alert for the driver of the currently driving autonomous vehicle is generated according to a set of rules.

18. The system of claim 16, wherein the trained driver attention model generates the alert when ambient sensor data indicates a dangerous condition beyond a danger threshold.

19. The system of claim 16, wherein the type of the sensory stimulus of the alert comprises one of:
an auditory alert;
a visual alert;
a tactile alert; and
an olfactory alert.

20. The system of claim 16, embodied in a cloud-computing environment, and wherein the alert comprises an olfactory alert including a smell emitted from the vehicle to alert the driver.

* * * * *